(No Model.) 3 Sheets—Sheet 1.
H. STEPHAN.
STRAW STACKER.
No. 442,751. Patented Dec. 16, 1890.
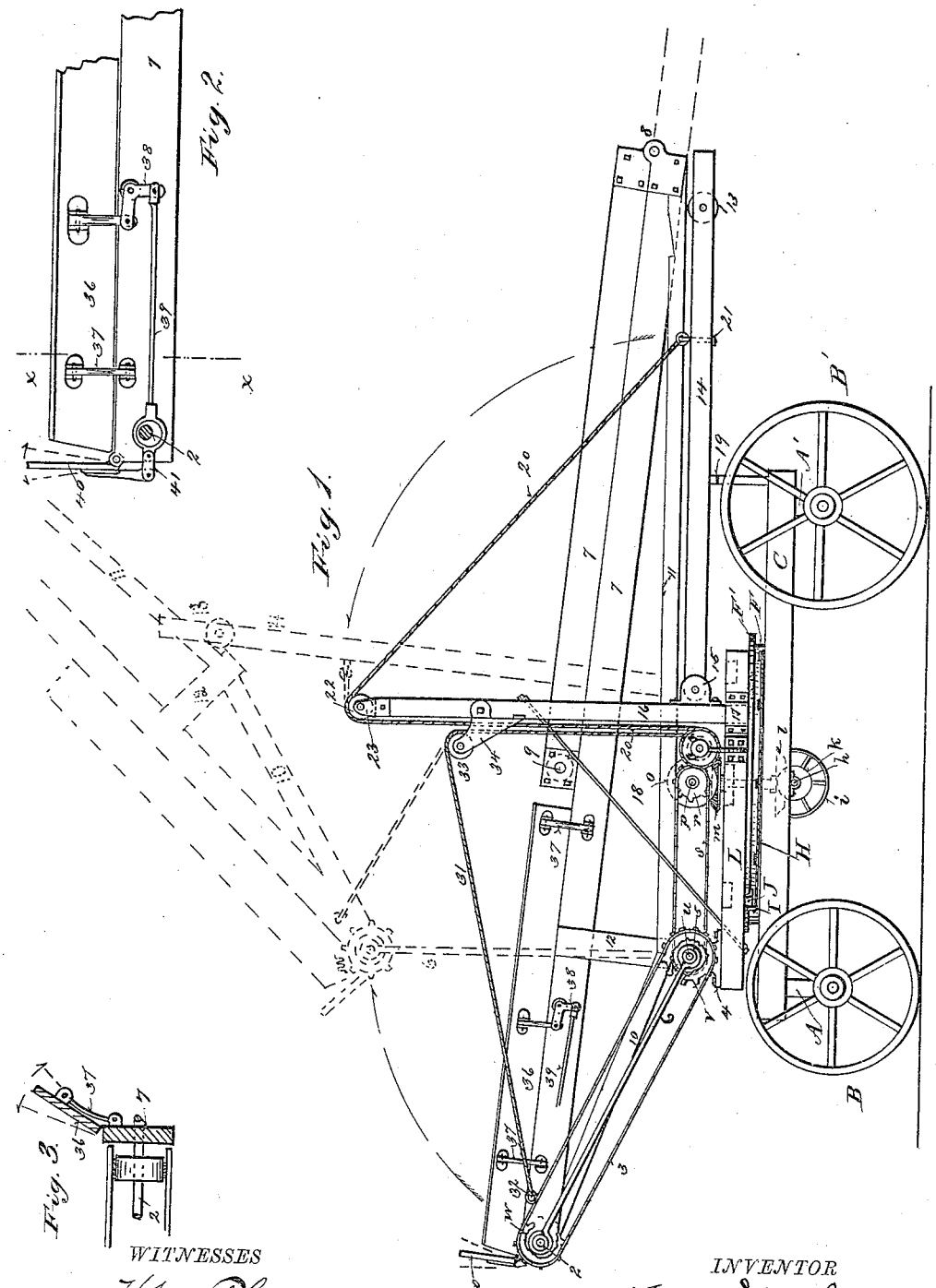
WITNESSES
H. M. Plaisted
Warren Hull
INVENTOR
Henry Stephan
H. A. Toulmin
his Attorney.

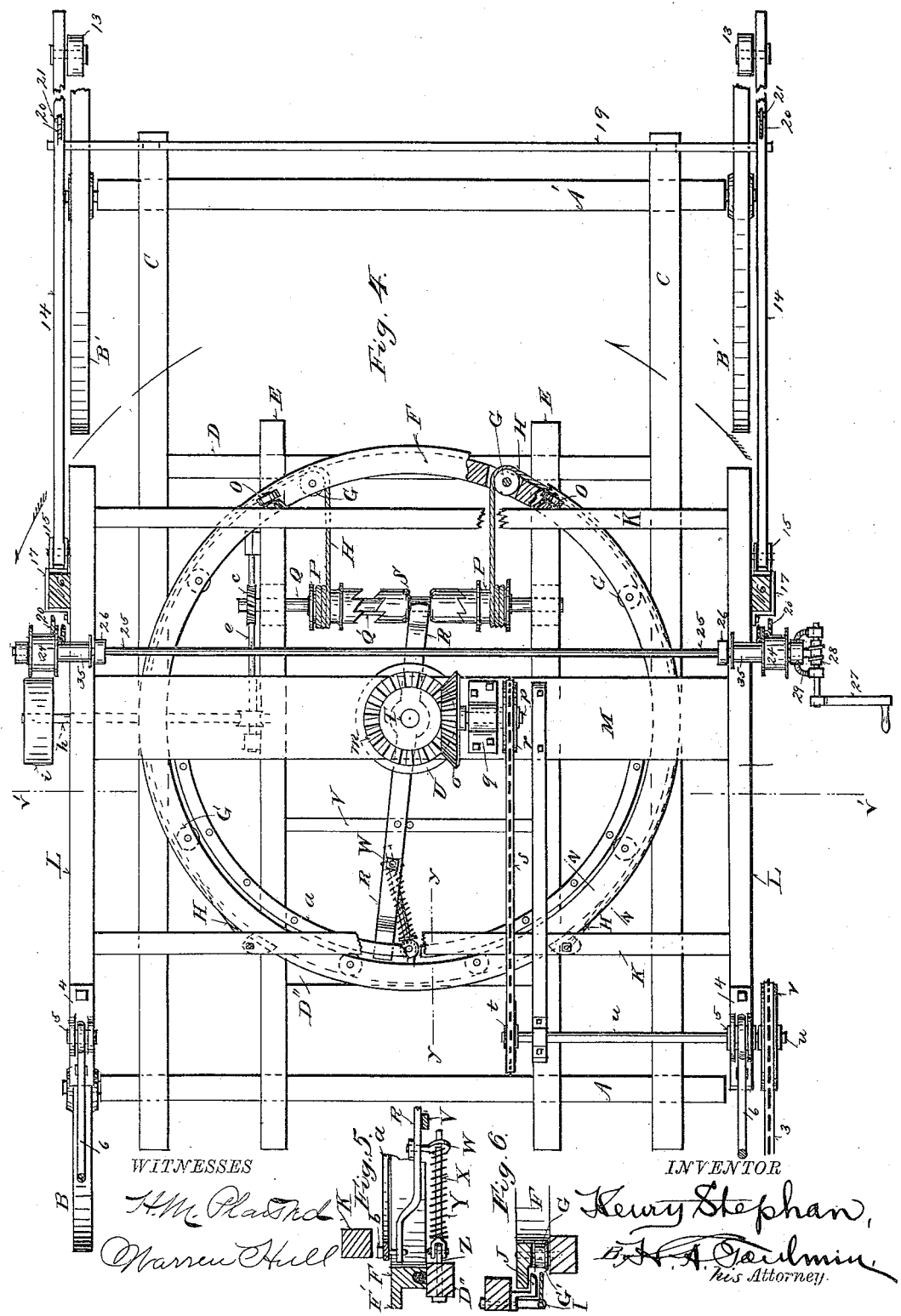

(No Model.)   3 Sheets—Sheet 3.
H. STEPHAN.
STRAW STACKER.
No. 442,751.  Patented Dec. 16. 1890.
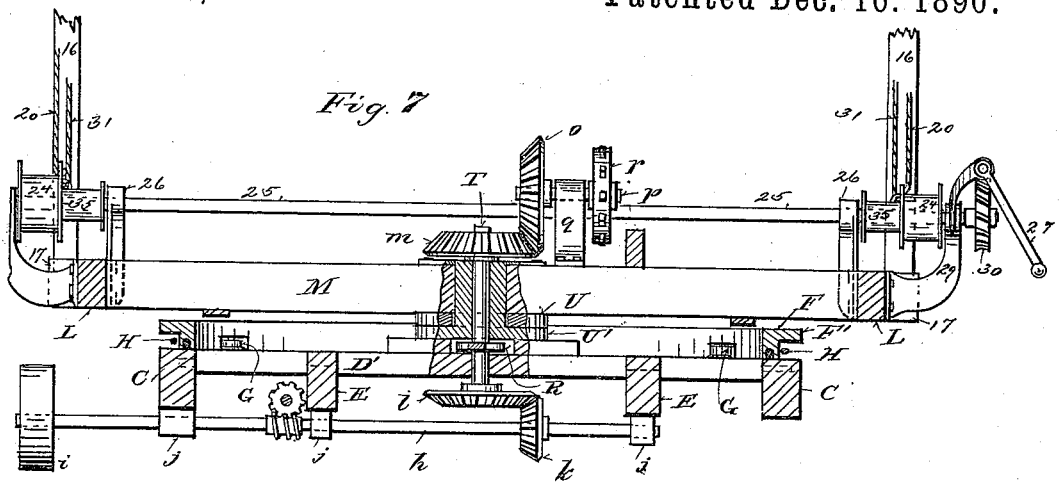
WITNESSES  INVENTOR

UNITED STATES PATENT OFFICE.

HENRY STEPHAN, OF SPRINGFIELD, OHIO, ASSIGNOR TO GEORGE W. STEPHAN, OF SAME PLACE.

STRAW-STACKER.

SPECIFICATION forming part of Letters Patent No. 442,751, dated December 16, 1890.

Application filed July 5, 1890. Serial No. 357,847. (No model.)

*To all whom it may concern:*

Be it known that I, HENRY STEPHAN, a citizen of the United States, residing at Springfield, in the county of Clark and State of Ohio, have invented certain new and useful Improvements in Straw-Stackers, of which the following is a specification, reference being had therein to the accompanying drawings.

This invention relates to certain new and useful improvements in straw-stackers.

My improvements have reference to the arrangement of the strike-off and the automatic action thereof; have reference to the swinging mechanism and the turn-table track; have reference to a convenient form of box for the elevating-bar; have reference to the mechanism for extending the outer end of the carrier-frame while it is being elevated, so as to deliver the straw in approximately a vertical line or plane, and have reference to other points of detail hereinafter more fully set forth.

In the accompanying drawings, forming a part of this specification, and on which like reference letters and figures indicate corresponding parts, Figure 1 represents a side view of my stacker folded, with the elevated position shown in dotted lines; Fig. 2, a side view of a portion of the carrier-frame and means for vibrating the side boards; Fig. 3, a section on the line $x\ x$ of Fig. 2; Fig. 4, a plan view of the stacker with the carrier-frame removed; Fig. 5, a section on the line $y\ y$ of Fig. 4; Fig. 6, a section on the line $z\ z$ of Fig. 4; Fig. 7, a cross-section on the line $v'\ v'$ of Fig. 4, with portions broken away to show the interior construction; and Fig. 8 a perspective view of the shafts and connections of the clutch mechanism in perspective, with the position of the timber-supports indicated by broken lines.

The letters A and A' designate the forward and rear bolster, respectively, of the stacker-body frame, mounted on the wheels B B'.

To the bolsters are secured the side sills C, connected by a cross-piece D, which carries the rear end of center sills E, the forward ends of which are supported by the forward bolsters. A center cross-piece D' under the center bolster of the swinging frame is preferably the only other cross-connection. This construction is strong yet light, and is preferably mounted low upon the bolsters, as seen in Fig. 1. These sills and cross-pieces are conveniently arranged to support the annular track F, which is secured thereto by bolts or otherwise. A number of idlers G are mounted on vertical axes in suitable openings in said track, and also have flanges G', which support the cord H, passing over said idlers and around said track beneath the annular flange F' thereof. The rear idlers, one of them being shown in the portion broken away in Fig. 4, guide the respective cord to the inside of the said track, where it is wound upon the clutch-windlass, as hereinafter described. The forward end of each cord is secured to an eyebolt I, passing through a hook J, secured to one of the cross-pieces K of the swinging frame, now to be described. This swinging frame preferably consists of side pieces L, connected together by cross-pieces K and K', and the center bolster M of the swinging frame. This forms a light yet strong rectangular frame, on which the carrier-frame and hoisting mechanism are mounted, and the whole revolve when the said cords H are actuated, as will presently be described. The weight of the carrier-frame and mechanism causes the swinging frame to bear to the rear, and it is therefore mounted on the rollers O at the rear end, which are secured by gudgeons and castings or in any convenient manner to the cross-piece K'. The front cross-piece K is supplied with hooks J, which are connected to the said piece by the eyebolt I, as already described, and have a bearing on the under side of the said flange F'.

The swinging mechanism consists of a clutch-windlass, on the drums P of which are mounted the said cords H. These drums are loosely mounted on the clutch-shaft. A double-faced clutch S slides on the shaft Q, and is caused to revolve therewith by means of the feather-key Q', and engages with the opposing faces of the said drums. A strike-off bar R engages with the said clutch S, and is pivoted on the center axle T, which forms the king-bolt, and which passes through the center bearing-plates U and U', secured to the upper and lower center bolsters, respectively. The forward end is conveniently supported by a cross-bar V, having a central hole therein, which matches with a corresponding hole in said strike-off, and is locked in the same by a pin when it is desired to throw the clutch S out of engagement with both drums, and thus allow the stacker to be used as a stationary one. An eyebolt W, carried by said bar R, has a rod X sliding therein, on which a spring Y is mounted. The rod X is pivoted to an eyebolt Z, mounted in a cross-piece D″ or otherwise. A semicircular bar $a$, having holes therein at suitable intervals, is carried by the swinging frame, and the forward end of said strike-off R is in convenient proximity to the said semicircular bar $a$. A pin $b$ will therefore catch the bar R at greater or less intervals, according to its position in the bar $a$, and move it till the spring acts to throw it over. Two pins on the opposite sides of the strike-off bar R will therefore cause the swinging table to rotate in any convenient part of a circle—such as an eighth, quarter, or nearly a half—according to the located position of said pins $b$, which cause the said clutch S to engage or disengage with one or the other of the drums P. This will actuate the respective cord H and swing the frame and its superincumbent mechanism in one or the other direction automatically.

I will now describe how the shaft Q is driven. Referring to Fig. 8, the wheel $c$, mounted on said shaft, engages with a worm $d$, carried by a shaft $e$, on the other end of which is a wheel $f$, meshing with a worm $g$, mounted on the driving-shaft $h$, having a driving-pulley $i$, mounted on the outer end thereof and carried in bearings $j$, preferably secured to the under side of the stationary body-frame. A beveled gear $k$ is mounted on the said driving-shaft $h$, so as to mesh with a beveled gear $l$, carried by the lower end of the aforesaid central shaft T. A beveled wheel $m$ on the upper end of the said shaft T meshes with a pinion $o$ on a shaft $p$, carried by a box $q$, secured to said center bolster M. A sprocket-wheel $r$ is also carried by said shaft $p$, which gives motion by means of a sprocket-chain $s$ to a sprocket $t$ on one end of a shaft $u$, which has a sprocket $v$, giving motion to the sprocket $w$ on the shaft 2 in the forward end of the carrier-frame by means of a sprocket-chain 3. Thus the driving-pulley $i$ drives these carrier-belts and also the clutch-windlass, which swings the carrier from side to side. It will be observed that the cords H are protected from the straw and interiorly connected with said clutch-windlass and its driving mechanism, thus forming a compact and well protected swinging mechanism.

I will now describe the carrier-frame and its hoisting mechanism. On the forward ends of said side pieces L are firmly secured boxes 4, having sleeves 5 mounted therein, which form bearings for the link-connections or elevating-bars 6 at their lower ends. The said shaft $u$ passes through this sleeve, which forms a box for the same, and thus the sleeve provides an inside and outside bearing. These bars preferably have eyes on both ends, the lower supported as already described and the upper one encircling the said axle 2 in like manner or in any convenient connection. The carrier-frame consists of side pieces 7, conveniently made in sections and hinged at 8, so that it may be folded over, as shown in Fig. 1. When in operation, it takes the direction indicated by dotted lines, forming a straight line. Within the carrier-frame are the usual slatted carrier-belts, as indicated in Fig. 3, mounted on axles 2 and 9 in the opposite ends of said carrier-frame. The side pieces 7 are stiffened by braces 10 and 11 on the lower sides thereof and braced by a strut 12, which preferably rests upon the said box 4 when in its lowered position. The braces 11 are supported by the rollers 13, mounted in strips 14, pivoted in the brackets 15, secured to standards 16, carried in the brackets 17, mounted on the swinging frame, or otherwise firmly secured, and stayed by the rods 18, as shown in Figs. 1 and 4. A rider 19, mounted on the rear end of the body-frame, serves as a rest for the strips 14 when in their lowered position. These strips are elevated by means of cords 20, fastened by the eyebolts 21 through said strips, or otherwise, each cord passing over a pulley 22, mounted in a bracket 23, preferably on the top of each of said standards 16. Drums 24, near both ends of a shaft 25, mounted in brackets 26, secured to the swinging frame, receive said cords 21 and wind up the same thereon when the shaft is rotated by a crank 27, which operates the worm 28, carried by the arms of a bracket 29, and meshing with a wheel 30, mounted on said shaft 25. This is a convenient means for rotating said shaft, but others may be employed. The worm 28 prevents the accidental rotation of the shaft 25. A cord 31 is secured at one end to the forward end of the carrier-frame—at 32, for instance—and passes over a pulley 33, carried by a bracket 34, secured to said standard 16, and winding up on a drum 35 of smaller diameter, also carried by said shaft 25 and adjacent to said drum 24. This hoisting mechanism is in duplicate on both sides of the machine, and it will be observed that by rotating the shaft 25 the cords 20 and 31 will be wound up with different velocities, thus elevating the rear and front ends of the carrier-frame, and at the same time throwing the delivery end outward, so that the straw will be delivered in the same vertical plane. The dotted lines in Fig. 1 show the elevated position of the carrier-frame at its extreme limit, and it will be seen that the rollers 13 travel on the strips 11 as a track. The rear end is elevated faster than the front end, as the strip 14 is longer than the elevating-bar 6, which, being fixed in length and oscillated about its lower end, extends the whole carrier-frame forward, as indicated by the dotted lines in Fig. 1, when the hoisting mechanism is operated. Side boards 36 are hinged to the carrier-frame 7 by the links 37, and caused to vibrate by the bell-crank 38, which is operated by the eccentric 39, mounted on the shaft 2. The back board 40 is also connected to said eccentric by a link 41, so that the revolution of the said shaft 2 causes the end and side boards to vibrate, as indicated by Figs. 2 and 3, to facilitate the action of the carrier-slats upon the straw in the hopper, and to prevent the wedging of the straw on the sides thereon.

The other attachments to the carrier-frame are, as usual, applied in the usual manner.

Having thus fully described my invention, what I claim as new, and desire to secure by Letters Patent, is—

1. In a straw-stacker, the combination, with a body-frame and annular track carried thereby having a flange, idlers mounted at intervals about said track, and cords carried over said idlers to the inside of said track, of a swinging frame adapted to turn about said track by means of said cords, clutch mechanism mounted within said track and consisting of a shaft, clutch-faced drums loosely mounted thereon and connected to said cords, and a double-faced clutch feather-keyed to said shaft and adapted to engage said drums, means to effect said engagement, a driving-shaft, and connecting mechanism between said driving and clutch shafts.

2. In a straw-stacker, the combination, with the swinging frame and the carrier-frame, of elevating-bars having eyes and connecting one end of said carrier-frame to the swinging frame, a box on each side of said swinging frame, a sleeve mounted therein, forming a bearing for said bar and adapted to form an interior shaft-bearing, pivoted strips adapted to elevate the other end of the carrier-frame, a shaft carried by the swinging frame, drums mounted on said shaft, means to rotate them, and cords connecting said drums with the elevating bars and strips, respectively, whereby the front end of the carrier-frame is automatically carried backward as the rear end is elevated, and thus the delivery end is raised in a vertical plane.

3. In a straw-stacker, the combination, with a carrier-frame and hinged side and end boards, of an eccentric, an eccentric-rod, and a bell-crank lever connected with the inclined side boards and to one end of said rod, which rod is otherwise unsupported, and thus adapted to reciprocate freely, an arm extending from the end board, and a link connecting it with the eccentric, whereby said eccentric-rod may reciprocate freely under the action of the eccentric and vibrate said side and end boards.

4. In a straw-stacker, the combination, with a swinging frame, the carrier-frame, and elevating mechanism consisting of link connections between the front end of the carrier-frame and the swinging frame, and elevating-strips carried by the swinging frame and having roller engagement with the rear of the carrier-frame, of standards carried by the swinging frame, pulleys mounted on said standards, a rotatable shaft and drums thereon carried by the swinging frame, ropes over said drums, and pulleys to actuate the elevating mechanism, the said drums through their connections being adapted to rotate the front end in an arc around its lower link-bearing as a center and to elevate the rear end proportionately to cause it to rise in a vertical plane.

5. In a straw-stacker, the combination, with a swinging frame and its king-bolt, of a clutch-shaft carrying drums, ropes connected to the swinging frame and operated by said drums and guided by suitable pulleys, a pivoted strike-off bar centered on said king-bolt and engaging the drum-clutches at one end, stops carried by the swinging frame to actuate said bar past the center, and spring devices carried by the body-frame and connected to said bar and acting thereon to effect the remainder of its movement.

6. In a straw-stacker, the combination, with a body-frame, a drum-shaft having drum-clutches, and a pivoted strike-off bar carried by said frame, of a swinging frame, ropes connected thereto and to the drums, suitable intermediate idlers over which the ropes are drawn and led within said swinging frame, and a removable pin carried by said swinging frame to engage the strike-off bar.

7. In a straw-stacker, the combination, with the vertical shaft forming the king-bolt, the swinging frame, the body, and an annular track with idlers thereon, of a clutch-shaft carried by the body within the said track, means for rotating said shaft, drums having opposing clutch-faces and loosely mounted on said shaft, cords extending over said drums and idlers to said swinging frame, a double-faced clutch feather-keyed to said shaft and adapted to engage either drum alternately, a strike-off bar pivoted to said king-bolt, a semi-circular bar having holes at intervals and carried by said swinging frame, and removable pins to fit said holes and to engage said strike-off.

In testimony whereof I affix my signature in presence of two witnesses.

HENRY STEPHAN.

Witnesses:
JOHN D. TAYLOR,
E. O. HAGAN.